Patented June 15, 1937

2,083,628

UNITED STATES PATENT OFFICE 2,083,628

METHOD OF MAKING VINYL DERIVATIVE ARTICLES

Georges E. Zelger, Montreuil sous Bois, France, assignor, by mesne assignments, to Eastman Kodak Company, Jersey City, N. J., a corporation of New Jersey No Drawing. Application January 10, 1934, Serial No. 706,100. In France January 11, 1933

4 Claims. (Cl. 260—2)

It is known that vinyl alcohol in any degree of polymerization has the property of combining with materials functioning as aldehydes to give especially plastic products which by suitable treatment can be used as sheets, strips, threads, filaments, fibres, and various moulded objects.

The ordinary method of manufacture of these products consists in preparing the products of a polyvinyl alcohol aldehyde condensation, washing it, purifying it if necessary, then dissolving it in a suitable solvent, coating, spinning, or moulding this solution and obtaining by evaporation or coagulation, the sheets or other articles desired.

The invention has for its object a process for obtaining manufactured articles of this type; sheets, threads, fibres, etc., offering the advantage of being simpler, more rapid and less costly.

The invention consists, in its preferred embodiment, in giving to the polyvinyl alcohol the definite shape which the finished product is to have, for example the form of a sheet or thread, and then subjecting the polyvinyl alcohol in that form to the condensation reaction.

According to one method, one coats in a thin layer on a suitable surface or presses through a perforated plate, or even moulds in the desired shape an aqueous solution of polyvinyl alcohol at the concentration of 25% for example.

Then the articles obtained, are treated, either immediately or after drying, with a bath heated to approximately 60° to 70° C. and containing the aldehyde and the catalyzer, for example:

| | Volumes |
|---|---|
| Formaldehyde (40% solution) | 1 |
| Hydrochloric acid at 22° Bé | 2 |
| Water | 3 |

The polyvinyl alcohol making up the sheet or other article is thereby changed immediately into a condensation product without appreciable deformation and it is sufficient then to carry out the washing and drying of the finished product.

According to a second method of execution, one coats, spins, or moulds the sheet, thread, or other article, using as a basic material a mixture comprised of the polyvinyl alcohol and the aldehyde, for example 125 grams of a solution such as that previously cited and 10 grams of finely powdered trioxymethylene.

One then treats the articles obtained with a bath containing the catalyzer, for example a warm bath of hydrochloric acid of 30% strength. The condensation takes place immediately without deformation of the treated articles and it is then necessary only to wash and dry the finished product.

According to a third method of execution, one uses as a starting material a mixture of polyvinyl alcohol and catalyzer and treats the articles obtained with the aldehyde in a manner similar to that above described.

It will be noticed that, according to the invention, advantage is taken of the fact that the reaction which is accelerated by the catalyzer is produced instantly under conditions of concentration and temperature, such as those described above, so that an extremely rapid condensation reaction is obtained between the various constituents.

In comparison with previous processes, the invention offers especially the advantage that it is not necessary to dissolve the condensation material and then eliminate the solvent, which simplifies the manufacture.

The coagulation baths containing the catalyzer, the aldehyde or both together can be aqueous or mixed with alcohol or any other substance the presence of which will be favorable toward the formation of the condensation products in the form and appearance desired.

The catalyzers and aldehydes can optionally be used in the form of gas or vapors, the bath being in this case replaced by an atmosphere containing the catalyzer, the aldehyde or both, and through which one causes the sheet, thread, or other article to pass.

The sheets or other articles of polyvinyl alcohol can be treated immediately after their preparation or on the contrary, after a varying length of time, even after complete drying.

The bath or atmosphere of treatment can have any temperature consistent with the concentration of the constituent and the speed with which one desires to carry out the condensation.

The intermediate article made up of polyvinyl alcohol coated, spun, or moulded, alone or with the addition of aldehyde or catalyzer, will naturally be able to undergo any treatment or addition with the view to modifying physical properties, color, appearance, etc.

Obviously one can use many materials with the function of an aldehyde and many catalyzers, all as known to those skilled in the art of the condensation of polyvinyl alcohols with an aldehyde. The polyvinyl alcohol may be a mixture of various polymers according to the properties desired in the articles being produced; such alcohols are well known to those skilled in this art.

What I claim as my invention and desire to be secured by Letters Patent of the United States is:

1. Process of producing formed articles of manufacture consisting principally of polyvinyl alcohol-aldehyde condensation products which comprises forming the article into the desired shape from an aqueous solution comprising polymerized vinyl alcohol and then condensing the polyvinyl alcohol with formaldehyde by treating the article with an aqueous bath comprising formaldehyde and hydrochloric acid.

2. Process of producing formed articles of manufacture consisting principally of polyvinyl alcohol-aldehyde condensation products which comprises forming the articles into the desired shape from an aqueous solution comprising polymerized vinyl alcohol and formaldehyde, then condensing the polyvinyl alcohol with formaldehyde by treating the article with an aqueous bath comprising hydrochloric acid.

3. Process of producing formed articles of manufacture consisting principally of polyvinyl alcohol-aldehyde condensation products which comprises forming the articles into the desired shape from an aqueous solution comprising polymerized vinyl alcohol and hydrochloric acid, then condensing the polyvinyl alcohol with formaldehyde by treating the article with an aqueous bath comprising formaldehyde.

4. Process of producing formed articles of manufacture consisting principally of polyvinyl alcohol-aldehyde condensation products which comprises forming the articles into the desired shape from an aqueous solution comprising polymerized vinyl alcohol and condensing the polyvinyl alcohol with formaldehyde in the presence of hydrochloric acid.

GEORGES E. ZELGER.